United States Patent [19]
den Hollander

[11] Patent Number: 5,627,555
[45] Date of Patent: May 6, 1997

[54] LINE FLICKER SUPPRESSION BY ADAPTIVE DE-INTERLACING

[75] Inventor: Willem den Hollander, Schlieren, Switzerland

[73] Assignee: RCA Thomson Licensing Corporation, Princeton, N.J.

[21] Appl. No.: 343,418

[22] PCT Filed: Dec. 13, 1993

[86] PCT No.: PCT/US93/12082

§ 371 Date: Nov. 23, 1994

§ 102(e) Date: Nov. 23, 1994

[87] PCT Pub. No.: WO94/24811

PCT Pub. Date: Oct. 27, 1994

[30]    Foreign Application Priority Data

Apr. 14, 1993 [GB] United Kingdom ............. 9307681

[51] Int. Cl.$^6$ ................................................ G09G 1/04
[52] U.S. Cl. ........................................... 345/12; 315/370
[58] Field of Search ................................ 348/447, 807; 345/12, 13; 315/370, 371

[56]    References Cited

U.S. PATENT DOCUMENTS

| | | |
|---|---|---|
| 4,354,186 | 10/1982 | Groothuis . |
| 4,521,774 | 6/1985 | Murphy ................................. 345/12 |
| 4,626,910 | 12/1986 | Kawamura . |
| 4,701,793 | 10/1987 | Dem Hollander et al. .......... 348/447 |
| 4,754,204 | 6/1988 | Ando et al. . |
| 4,795,947 | 1/1989 | Gleim et al. . |
| 4,888,529 | 12/1989 | Madsen et al. . |
| 4,996,595 | 2/1991 | Naito et al. . |
| 5,182,643 | 1/1993 | Futscher ............................... 348/447 |

OTHER PUBLICATIONS

Line Flicker Reduction by Adaptive Adjustment of Vertical Deflection in TV Receivers, H.A. Pedersen et al. IEEE Consumer Electronics 1990, pp. 291–295.

*Primary Examiner*—Richard Hjerpe
*Assistant Examiner*—Ricardo Osorio
*Attorney, Agent, or Firm*—Joseph S. Tripoli; Joseph J. Laks; Francis A. Davenport

[57]    ABSTRACT

A television display system employing edge brightness flicker reduction by modulation of the vertical deflection signal has digital control words for modulation polarity (D) and magnitude (S). These digital words are coupled to an amplifier (900) and converted to a bipolar analog signal (Bp). The bipolar analog signal comprises values in a first and second range. Signals in the first range produce vertical deflection modulation in a first direction and signals in the second range produce vertical deflection modulation in the opposite direction.

15 Claims, 2 Drawing Sheets

DRIVE CIRCUIT 900 ized into 8 bit words a+, which appear as a parallel signal at an output of converter 100. An 8 bit quantization is selected to maintain video signal quality since the digitized signal will be delayed and reconverted to an analog signal for CRT display. The sample rate of converter 100, is selected based on the required video display quality and, for circuit convenience in terms of clock frequency generation, ease of filtering etc. The composite video signal is also coupled to a sync system 150. The sync system comprises a sync separator, sync generator and a phase locked clock generator, not illustrated. Sync generator is genlocked to the separated input video sync, and may for example, be an integrated circuit type SAA1043. The sync system 150 outputs various timing signals which are coupled throughout the system illustrated in FIG. 1.

LINE FLICKER SUPPRESSION BY ADAPTIVE DE-INTERLACING

This invention relates to the suppression of line brightness flicker in video displays.

BACKGROUND OF THE INVENTION

In current broadcast television systems a picture or frame, is composed of two fields which are generated and transmitted sequentially in time. This method of image scanning and display is termed interlaced scanning. Interlaced scanning has various benefits, one of which is a reduction of large area image flicker which results from the presentation of each image twice per picture. However, since the two fields are off set in time, possibly by generation and certainly by transmission, artifacts are produced at vertical transitions within the displayed image. For example, an edge of a vertical transition will be portrayed by a line, or part thereof, from a single field. Thus the edge of the vertical transition is described by a signal which is present once per picture, or frame. Hence, due to the luminous decay of the display phosphor, the edge will diminish in brightness before re-illumination in the next frame. Thus, for the edge line, the interlacing process fails to raise the image display rate beyond that of human visual perception with the result that the edge defining line flickers in brightness at picture rate.

It is known that the visibility edge or line flicker may be reduced by adaptive modulation of the vertical deflection field. However, the deflection amplifier employed for such adaptive modulation requires the use two control signals. A first signal defines modulation magnitude and a second signal which controls a bridge configuration to determine deflection direction. It is desirable that an amplifier for adaptive modulation of the vertical deflection field be simplified to be responsive to a single control signal which is indicative of both magnitude and direction.

SUMMARY OF THE INVENTION

A video display comprises a CRT having a scanning electron beam describing a raster. The electron beam is deflected by a supplementary deflection means. Means coupled to a source of display video for detecting therein flicker causative signals and generating therefrom a shift signal of magnitude proportional to an amplitude of said flicker causative signals and direction signal indicative of a direction for required for flicker compensation. Means coupled to said shift signal and said direction signal for generating an analog signal. Means for coupling said analog signal to said supplementary deflection means for deflection of the electron beam by an amount related to the shift signal.

DETAILED DESCRIPTION

In a video display edge or line flicker may be reduced by adaptive adjustment of the vertical deflection such that edge information is displaced on the tube face toward the object that the edge defines. In addition the adaptive adjustment or dynamic de-interlacing may be proportional to the video level or intensity of the edge, thus for a bright area the flickering edge is shifted to be adjacent to the area and effectively blend therewith. Areas with lower brightness require less edge placement shift to reduce the visibility of the flicker. The adaptive adjustment of the vertical deflection is achieved by supplementary modulation of the vertical deflection field. This supplementary modulation may be achieved by electrostatic or electromagnetic means, for example by auxiliary coils mounted on the tube neck.

Figure 1:
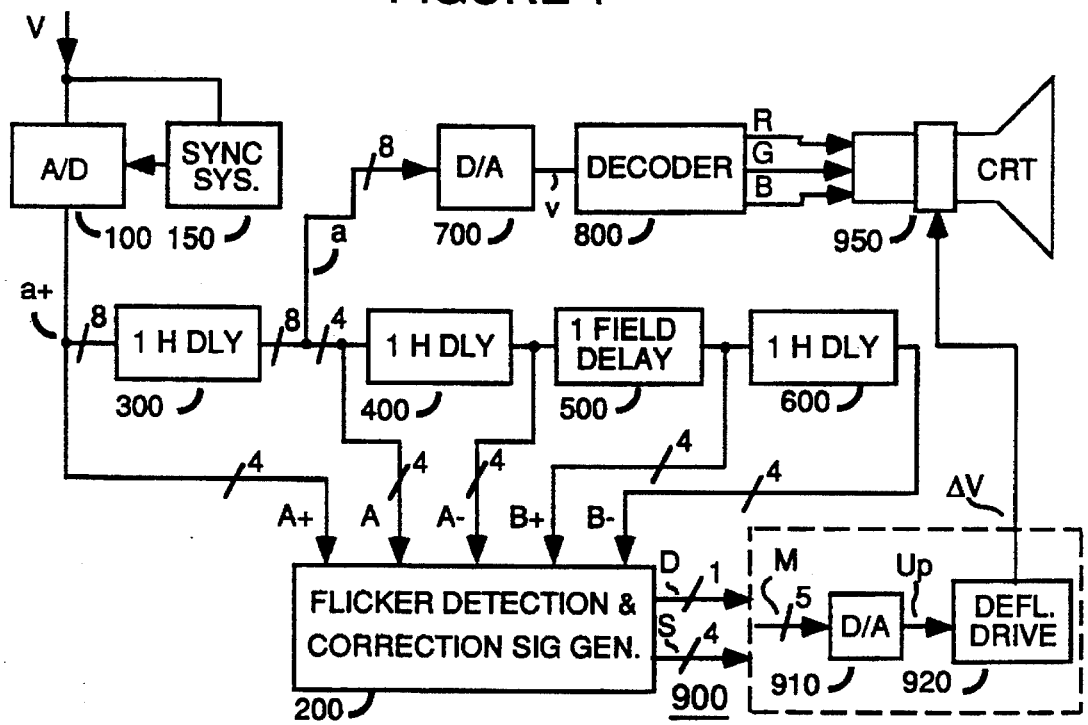
FIG. 1 shows a block diagram of a system in accordance with an inventive arrangement.

FIG. 1 shows a block diagram of a line flicker reduction system in accordance with an inventive arrangement. Composite video signal V, is coupled an analog to digital converter 100. Converter 100 samples the composite video signal V, for example at 12.5 MHz. The samples are quan- The 8 bit parallel, digital video signal words a+, from converter 100 are coupled to an 8 bit digital delay 300, having a delay time of one horizontal period or 1H. The one line delay is required in the display video path to the display the video symmetrically about the flicker correction. The 1H delayed video sample a, is then coupled to a digital to analog converter 700 which generates an analog value for each 8 bit digital input word. Thus, the output of converter 700 is a composite video signal v, virtually identical to the original composite input signal V, but delayed by one horizontal period. It is well known that prior to sampling in analog to digital conversion, a low pass filter may be required to limit the bandwidth of the input signal in proportion to the sampling frequency. Similarly, following digital conversion to an analog signal format, a lowpass filter is beneficial to remove sample frequency components from the recovered signal. Composite video signal v, delayed by one TV line, is coupled to a decoder 800, which separates the various signal components from the composite signal and generates therefrom the appropriate drive signals for display on a cathode ray tube. For example in FIG. 1, red, green and blue signals are coupled to a CRT for display.

A 4 bit digital video signal has sufficient quantization accuracy for flicker detection and correction signal generation. Hence, the 8 bit digital video signal a+, is truncated to a 4 bit signal A+, where the 4 bits represent the four most significant bits of the original 8 bit word a+. The truncated 4 bit digital signal A+ is coupled to the flicker detection logic and digital signal generator 200. The 8 bit digital video signal a, delayed by one horizontal period, is also truncated to 4 bits, yielding signal A. Signal A, is coupled to the flicker detection logic and digital signal generator 200, and also to a 4 bit digital delay 400 having a delay of one horizontal period. The output from delay 400 signal A−, is coupled to the flicker detection logic and digital signal generator 200 and also to a 4 bit digital delay 500 having a delay of approximately one field period. Which, for example in 625 line systems represents 312 horizontal line periods. The output from delay 500 is a 4 bit digital signal B+, which is coupled to generator 200 and also to digital delay 600. Digital delay 600 has a delay of one horizontal period and yields an output signal B−, which is coupled to generator 200.

Generator 200 is a flicker detection and correction signal generator and receives five digital video signal samples which are used to detect edge flicker causative signals, to derive a corrective vertical shift signal, and to determine the direction of the corrective shift, i.e. up or down. A detailed description of the operation of generator 200, may be found in U.S. Pat. No. 4,888,529 to Madsen et al. However, a simple explanation is as follows. To detect edge flicker causative signals, each pixel is compared in the vertical direction, with the pixel which preceded it, i.e. the same horizontal position but one line period earlier, and the pixel which followed it, i.e. one horizontal period later. Thus, digital signal A represents the reference pixel to be compared with adjacent pixels above and below and in the previous field. Thus signal A+, represents a pixel one line later than the reference pixel and signal A− represents the pixel one line earlier. Digital signal B+ represents the position of the reference pixel one field earlier and signal B− represents the pixel one line prior to the reference pixel in the earlier field. Determination of corrective direction is performed by comparison of the reference pixel A with pixels B+ and B− from the previous field and results in a single bit shift direction signal. An algorithm is used to determine the magnitude of the vertical shift in proportional to the amplitude value of the video signal comprising the flickering edge. The algorithm for this magnitude determination is described in the reference. The functions of generator 200 may, for example, be provided by a Field Programmable Gate Array semiconductor device, for example an XC3030PC68.

The output signals from generator 200 comprise a single bit direction signal D and a 4 bit shift magnitude signal S, these two digital signals are coupled to an inventive drive circuit 900. Drive circuit 900 comprises a digital to analog converter 910, and a deflection drive amplifier 920. At the input of D/A 910, the single bit direction signal D is combined with the 4 bit magnitude signal S, to produce a 5 bit signal word, M. The single bit direction signal D represents the most significant bit of the 5 bit word M. Digital to analog converter 910, generates a unipolar output signal Up, to be described below, for each 5 bit input word. The output signal Up, is coupled to a deflection driver amplifier 920 which generates a supplementary deflection signal ΔV. Supplementary deflection signal ΔV, is coupled to a deflection means 950, mounted on a cathode ray tube, CRT.

Figure 2:
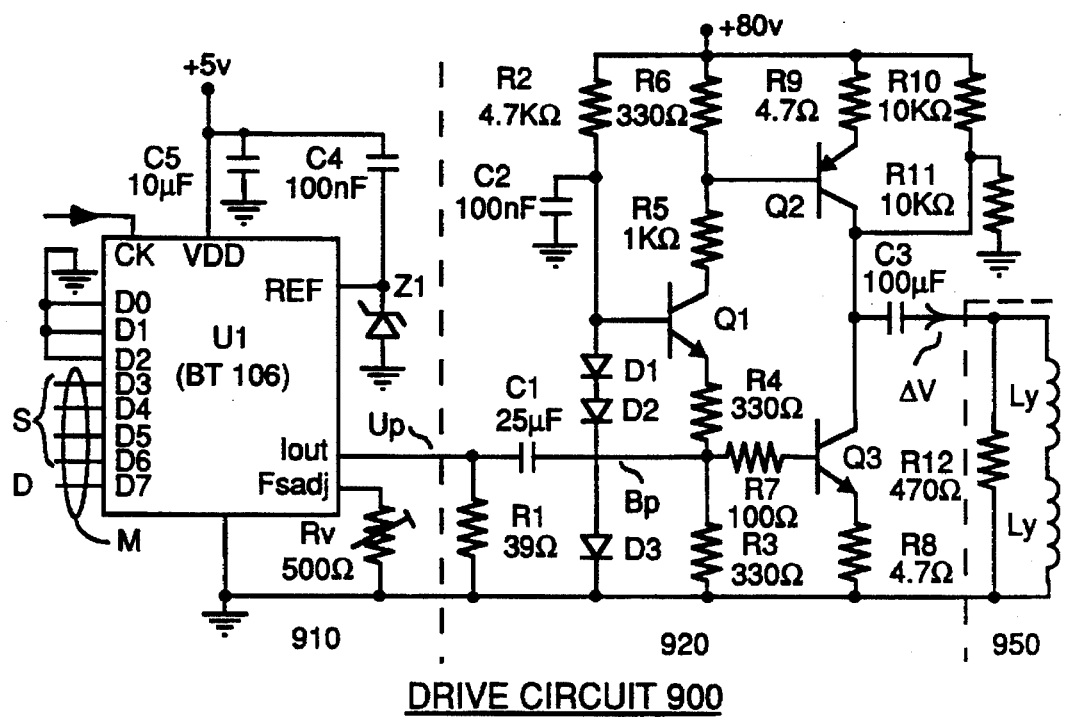
FIG. 2 is a circuit diagram of the inventive embodiment.

FIG. 2 depicts an embodiment of inventive drive circuit 900 shown in FIG. 1. Digital to analog converter 910 comprises an integrated circuit U1, for example type BT 106. The digital to analog converter is powered from a 5 volt supply and has an internal reference connected to a band gap reference device Z1 which generates a voltage of 1.2 volts. A clock pulse signal is coupled to the D/A converter which determines the timing of the converter functions. Capacitors C4 and C5 provide power supply decoupling. Integrated circuit U1 is an 8 bit converter where only 5 data input bits are used, the three least significant bits being connected to ground. The data inputs D3–D6 are coupled to the 4 bit shift signal S from the detector and digital signal generator 200. The fifth data input bit D7, is coupled to the single bit, up/down signal D from generator 200. Digital to analog converter U1 generates an output current at Iout, responsive to the value of input data word M. Since converter U1 is connected between ground and a +5 volt supply, the D/A output signal, will be represented by a unipolar direct current. The current from output Iout is coupled to a resistor R1 to generate a DC voltage signal Up, which is unipolar, having a single range of voltage polarity from zero to a positive value. The output signal at Iout is a DC current which has a specific fixed value, determined by word M and held for the duration of one clock cycle. At the next clock cycle a new word M is converted and the current at Iout is stepped to a new value. Thus the output signal at Iout may be considered to be a series of direct current steps changing abruptly at clock pulse rate and held constant between clock pulses. The value of current generated per digital input bit is set with a variable resistor Rv. Variable resistor Rv, is adjusted with data word M set to all logical 1's, to generate a one volt output signal Up across resistor R1.

Signal Up, is a unipolar DC voltage having a voltage value in a range between zero and one volt. The specific value being set by the value of input data word M. Data word M has 5 bits, thus the output voltage signal Up, may have one of 32 possible values. However, since signal M, is assembled from two data words, the output voltage signal Up may be considered to have two possible ranges of DC values. For example, with input data bit D7 equal to logical zero, data bits D0–D3 can describe DC voltages having 15 possible values. Similarly with input data bit D7 equal to logical one, data bits D3–D6 still describe DC voltages having 15 possible values, but offset in DC value. The 15 possible values are effectively superimposed on a value generated by data bit D7 when at logical 1. Under quiescent conditions, ie. no vertical shifting, data bit D7 is logically 1 and data bits D3–D6 are logically 0, which results in DC voltage Up, having a value of 0.5 volts. The unipolar, DC voltage Up, may be considered to have values in a first range when data bit D7 is logically low, and in a second range when data bit D7 is logically high.

The unipolar voltage Up, is coupled via a capacitor C1 to become an AC signal Bp, at the junction of resistors R3, R4 and R7 of drive amplifier 920. Resistors R3 and R4 are coupled in series between an emitter terminal of an NPN transistor Q1 and ground, with resistor R4 connected to the emitter and resistor R3 connected to ground. Resistor R7 couples the junction point of capacitor C1 and resistors R3, R4 to a base terminal of an NPN transistor Q3. The emitter terminal of transistor Q3 is coupled to ground via a resistor R8, and the collector terminal is coupled to a junction of a capacitor C3 and a collector terminal of a PNP transistor Q2.

The base terminal of transistor Q1 is coupled to a biasing network comprising three diodes, D1, D2 and D3, connected in series to ground. The anode of diode D1 is connected to the base of transistor Q1, and the cathode of diode D1 is connected to the anode of diode D2. The cathode of diode D2 is connected to the anode of diode D3 and the cathode is connected to ground. The base terminal of transistor Q1 is decoupled to ground by a capacitor C2, and is further coupled to an +80 volt power supply via a resistor R2. The collector terminal of transistor Q1 is connected to the +80 volt power supply via a pair of resistors R5 and R6 connected in series. Resistor R5 is connected to the collector of transistor Q1 and resistor R6 is connected to the supply. The junction of the resistors is connected to the base terminal of transistor Q2. The emitter terminal of transistor Q2 is coupled to the +80 volt power supply via a resistor R9. The collector junction of transistors Q2 and Q3 is biased to approximately half the supply voltage by a potential divider formed by resistors R10 and R11. Resistor R10 is connected to the 80 volt supply and is connected in series with resistor R11 which is connected to ground. Thus the junction of the resistors is at a potential of about 40 volts which is applied to capacitor C3. A bias potential is required at the collectors of transistors Q2 and Q3 since under quiescent conditions, i.e. no vertical shifting, both transistors are off and without such biasing, the potential on capacitor C3 would be determined by factors such as collector leakage current.

Capacitor C3 couples a vertical shift signal ΔV from the collectors of transistors Q2 and Q3 to a supplementary deflection stage 950. The deflection stage 950, may for example, comprise a pair of windings Ly, connected in series to ground and coupled in parallel with a damping resistor R12. Windings Ly, may be fabricated as flexible coils which are conformed to a neck portion of a cathode ray tube to produce supplementary vertical deflection of a scanning electron beam.

Figure 3A:
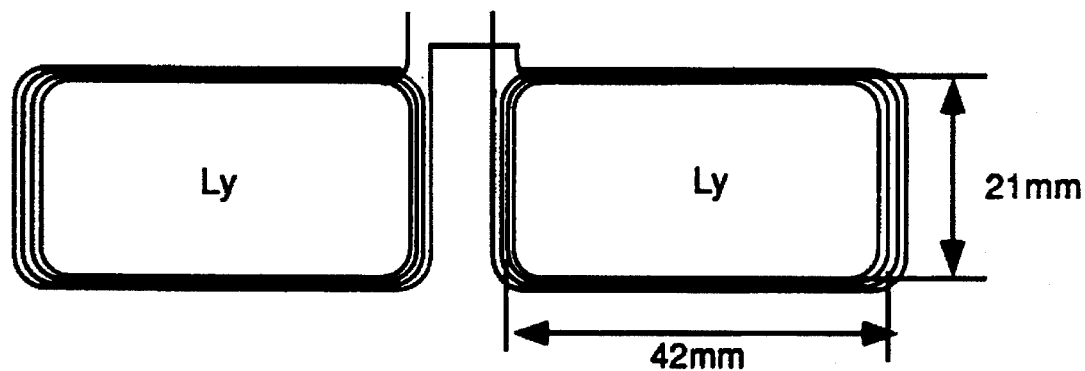
FIGS. 3A and 3B illustrate constructional details of the auxiliary coil depicted in FIGS. 1 and 2, for modulation of the vertical deflection field.
Figure 3B:
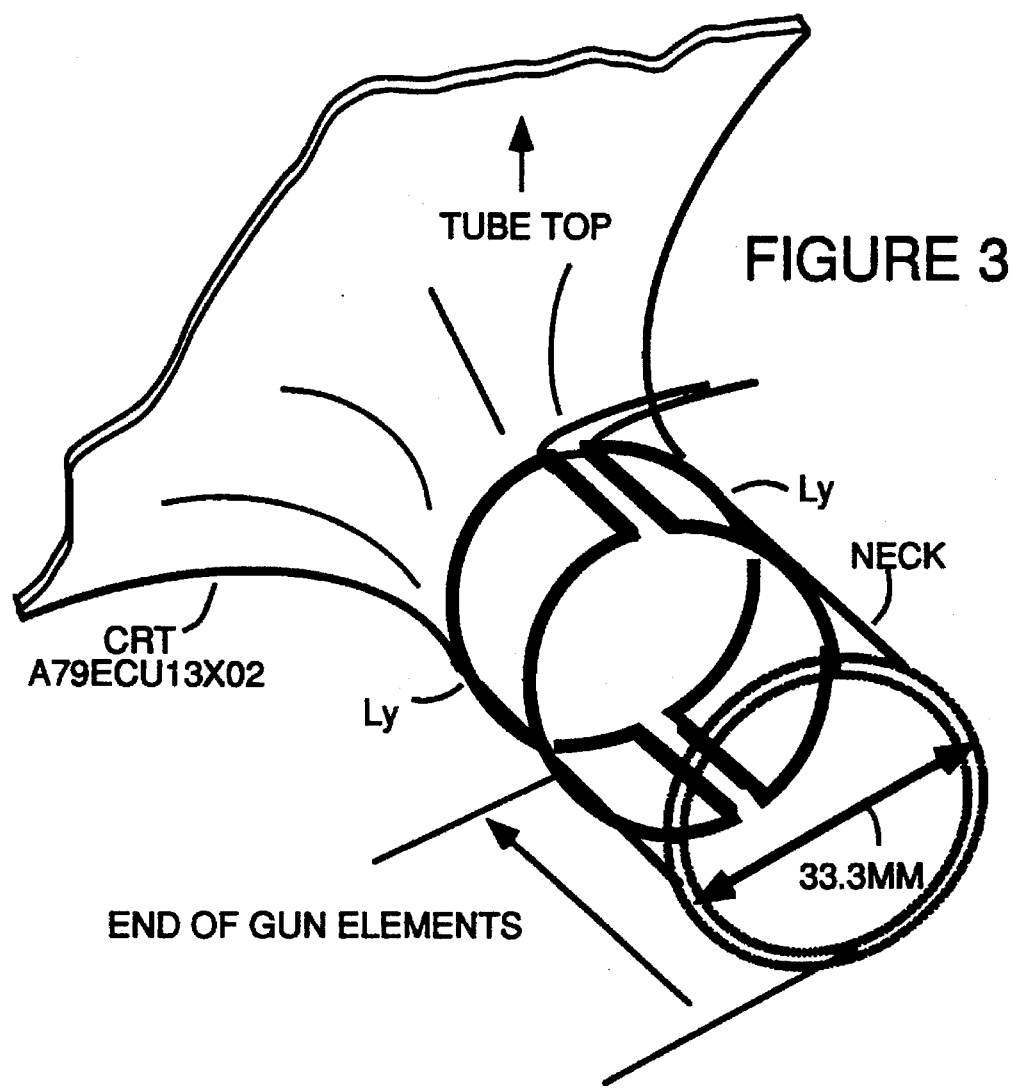

FIG. 3A illustrates the supplementary deflection windings Ly. FIG. 3B shows the conformation of windings Ly to the tube neck and the position on a cathode ray tube neck portion for modulation of the vertical deflection field. Each winding Ly, comprises 15 turns of 0.18 mm enameled cooper wire. The two windings are connected in series and when located under a deflection yoke develop an inductance of 48 microhenries. The windings have a DC resistance of 3 ohms and a deflection sensitivity of 10 –12.5 mm/ampere at an EHT of 29 Kv.

In drive amplifier 920, the pair of complementary transistors Q2 and Q3 operate as current sources to charge and discharge coupling capacitor C3. Transistors Q2 and Q3 are biased by transistor Q1 to be essentially non-conductive. The base of transistor Q1 is biased at a positive potential of approximately 2.1 volts due to current flow from the +80 volt supply to ground via resistor R2 and the series connected diodes D1, D2 and D3. Thus the emitter of transistor Q1 is at a potential of approximately 1.4 volts and this value is voltage divided by resistors R3 and R4 to produce approximately 0.7 volt at the base of transistor Q3. Since resistor R3 is equal to resistor R6 and resistor R8 is equal to resistor R9 current flow in transistors Q2 and Q3 will of similar magnitude but of opposite polarity. Since the base of transistor Q1 is decoupled to ground by capacitor C2, transistor Q1 functions as an in-phase or common base amplifier.

Advantageously coupling capacitor C1 removes the DC component from unipolar signal Up resulting in an AC, bipolar signal Bp. The AC, bipolar signal Bp coupled via resistor R7 to the base of transistor Q3 and via resistor R4 to the emitter of transistor Q1. Bipolar signal Bp developed following capacitor C1, represents changes in the value of data word M coupled to the digital to analog converter U1. As described earlier, changes in the logical value of data bit D7 will result in a significant change or step in the value of signal Up and thus also in the AC signal Bp. The AC signal Bp is symmetrically disposed about the DC potential established at the junction of resistors R3 and R4. Hence positive excursions of signal Bp, will result in transistor Q3 turning on and removing charge from capacitor C3, quiescently biased to 40 volts. Thus generating a current in the deflection stage which results in supplementary vertical deflection of the electron beam. However, the positive excursion of signal Bp, coupled to the emitter of transistor Q1 sustains a non-conducting condition in transistor Q2. When signal Bp, swings negatively, transistor Q3 ceases conduction, and transistor Q1 increases conduction, with the result that transistor Q2 turns on and charges capacitor C3. Thus, a current of opposite polarity is circulated in the deflection stage resulting in vertical electron beam deflection in the opposite direction. A change in signal Up from 0.5 volts to one volt results in a current flow of approximately 100 milliamperes in transistor Q3, and a change from 0.5 volts to zero volts produces a corresponding magnitude current of approximately 100 milliamperes in transistor Q2.

Drive circuit 900 provides a simplified drive amplifier for coupling between the digital control signals D and S, and the supplementary deflection stage. Drive circuit 900 eliminates previous requirements for a single polarity drive amplifier responsive to signal S, coupled to a direction switch controlled by digital signal D. The digital control words D and S are advantageously combined as digital word M which is converted to generate an analog signal Up having various values of single polarity. The single polarity signal is coupled by capacitor C1, removing the DC component therein to produce an AC signal Bp. The AC signal varies in a bipolar manner, swinging positively and negatively about a bias potential responsive to data word M. The bias potential is such that under quiescent conditions a pair of complementary transistor current sources are non-conductive. A positive change in signal Bp turns on one current source which changes the quiescent charge on the capacitor coupled to the deflection stage. Similarly a negative change in signal Bp turns on the second current source and turns off the first current source, resulting in an opposite current flow in the deflection coupling capacitor. Thus inventive drive amplifier 920 achieves bidirectional deflection current flow in a deflection winding responsive to a unidirectional, unipolar control signal, derived from a digital signal by digital to analog conversion.

I claim:

1. A video display comprising:

a CRT having a scanning electron beam describing a raster;

means (950) for supplementary deflection of said electron beam;

means (200) coupled to a source of display video signals for detecting therein flicker causative signals and generating therefrom a shift signal (S) of magnitude related to an amplitude of said flicker causative signals and a direction signal (D) indicative of a direction required for flicker compensation;

means (910) coupled to said shift signal and said direction signal for generating an analog signal (Up); and means (920) for coupling said analog signal to said supplementary deflection means (950) for deflection of said electron beam in said direction established by said direction signal (D) and by an amount related to said shift signal (S).

2. The video display of claim 1, wherein said supplementary deflection means (950) comprises an auxiliary deflection winding mounted on said CRT.

3. The video display of claim 1, wherein said means for supplementary deflection (950) deflects said electron beam in a direction of a vertical component of said raster.

4. The video display of claim 1, wherein said means for generating said analog signal (910) comprises a digital to analog converter (U1).

5. The video display of claim 4, wherein said analog signal (Up) is unipolar.

6. The video display of claim 5, wherein said coupling means said comprises a capacitor (C1) for generating a bipolar signal (Bp) coupled to an amplifier (Q1 Q2 Q3) for driving said supplementary deflection means (950).

7. The video display of claim 6, wherein said unipolar analog signal (Up) comprises a first and second range of amplitude values, where said first range of values represents deflection of said electron beam in a first direction, and said second range of values represents deflection of said electron beam in an opposite direction.

8. The video display of claim 7, wherein said capacitor (C1) coupling removes a DC component from said unipolar analog signal (Up) converting said unipolar analog signal to said bipolar analog signal (Bp).

9. The video display of claim 8, wherein said bipolar analog signal (Bp) has amplitude values determined by a digital signal (M) coupled to said digital to analog converter (U1) said digital signal (M) having a most significant data bit which upon digital to analog conversion determines said first and second range of amplitude values.

10. The video display of claim 7, wherein said amplifier comprises first (Q3) and second (Q2) current sources coupled to said supplementary deflection means (950) where amplitude values in said first range cause said first current source (Q3) to produce deflection in a first direction and amplitude values in said second range cause said second current source (Q2) to produce deflection in an opposite direction.

11. A video display comprising:

a CRT having a scanning electron beam describing a raster;

means for supplementary vertical deflection (950) of said electron beam;

means (200) responsive to a video signal for generating therefrom a digital signal (M) for supplementary vertical deflection;

means (910) coupled to said digital signal for generating an analog signal (Up) of one polarity only, having a first and second range of amplitude values, where said first range of values represents deflection of said electron beam in a first direction, and said second range of values represents deflection of said electron beam in an opposite direction; and means (920) responsive to said analog signal for driving said supplementary vertical deflection means (950) for deflection of said electron beam in said first or said second vertical direction responsive to said first or second range of amplitude values, respectively.

12. The video display of claim 11, wherein said video signal responsive means (200) responds to a video signal transition in a vertical direction.

13. The video display of claim 11, wherein said video signal responsive means (200) responds to an amplitude of video signal transition in a vertical direction.

14. The video display of claim 11, wherein said driving means (920) generates responsive to said analog signal (Up), a bipolar signal (Bp) for coupling to said supplementary vertical deflection means (950) for vertical deflection.

15. The video display of claim 11, wherein said digital signal (M) comprises data defining polarity and data defining magnitude.

* * * * *